UNITED STATES PATENT OFFICE.

WALTER LAMB, OF ERIE, PENNSYLVANIA.

PROCESS OF PREPARING A PORK AND CEREAL FOOD.

1,063,358. Specification of Letters Patent. Patented June 3, 1913.

No Drawing. Application filed February 13, 1913. Serial No. 748,091.

*To all whom it may concern:*

Be it known that I, WALTER LAMB, a citizen of the United States, residing at Erie, in the county of Erie and State of Pennsylvania, have invented new and useful Improvements in the Processes of Preparing a Pork and Cereal Food, of which the following is a specification.

My process relates to the extraction of nutritive and flavoring constituents of pork by subjecting the same to the action of a liquid, and forming a mass by using a cereal in combination with the liquid and particles of meat pulp; seasoning the product and then canning in air-tight packages, or pouring it into open pans and allowing it to solidify in these packages without sealing.

In making the food I proceed as follows:—I take a quantity of fresh pork, preferably a shoulder, and cut the meat into small pieces; I add to this a quantity of heavily salted pickled pork in sufficient amount to give to the finished product the proper degree of saltness; (this latter is chopped very fine.) I then subject the meat to the action of a liquid, preferably water; I heat the same and form an extract of the pork using one or more cereals in combination so as to form a cooked mass when the product is finished; I season the food to taste, and I also retain the particles of meat in the mass.

In the matter of seasoning various agents may be used, individual taste of course, being considered. I usually employ pepper, salt and pulverized thyme. The cereals I most advantageously use are a combination of entire wheat flour and granulated white-corn meal; but other cereals of course can be substituted.

Although as a meat constituent the combination of fresh and pickled pork is usually most desirable, I do not confine myself to it; I sometimes use fresh-pork throughout.

This pork and cereal food can be made to have a good nutritive value; can be sold at a reasonable price; can be cheaply transported long distances when canned; and it can also have the proportions of lean and fat varied so as to adapt it to different climates.

In canning the product any of the well known processes in glass or tin may be adopted; but the one I prefer is that in which the package is punctured after being boiled and then immediately closed. This gets rid of a quantity of contained air.

I claim:

1. The process of making a new food product which consists in dividing pork into pieces and extracting nutritive and flavoring constituents of the same by subjecting it to the action of a liquid, cooking the pork and liquid and using a cereal in combination to form a mush; seasoning to taste; and forming a cooked mass composed of particles of meat, cereal, meat extract and seasoning in combination, substantially as described.

2. The process of making a new food product which consists in dividing pork into pieces and extracting nutritive and flavoring constituents of the same by subjecting it to the action of a liquid; cooking the pork and liquid together, using a cereal in combination to form a mush; seasoning to taste; and forming a cooked mass composed of particles of meat, cereal, meat extract and seasoning in combination; and then preserving the same in air-tight receptacles, substantially as described.

WALTER LAMB.

Witnesses:
F. H. KRIMINS,
CHRISTINE KRIMINS.